Nov. 6, 1928. 1,690,573

N. FALLEK

STORAGE BATTERY SEPARATOR ELEMENT AND METHOD OF PRODUCING SAME

Filed May 4, 1925

INVENTOR,
Nathan Fallek.
By Martin C. Smith, atty.

Patented Nov. 6, 1928.

1,690,573

UNITED STATES PATENT OFFICE.

NATHAN FALLEK, OF LOS ANGELES, CALIFORNIA.

STORAGE-BATTERY SEPARATOR ELEMENT AND METHOD OF PRODUCING SAME.

Application filed May 4, 1925. Serial No. 27,689.

My invention relates generally to storage batteries and more particularly to a separator element that is positioned between the lead plates or grids in a battery jar or container, and the invention herein disclosed, is an improvement on the invention forming the subject matter of my application for U. S. Letters Patent filed April 5, 1921, Ser. No. 458,689 and allowed September 29, 1922.

The principal objects of my present invention are, to generally improve upon the particular form of separator element that was set forth in my aforesaid patent application; to provide a relatively simple, easily practiced and economical method of producing the separator elements; further, to provide a storage battery separator element that has a relatively high degree of porosity and absorptive qualities and further, to provide a separator of the character referred to, that will produce maximum results as an insulator between the grids or plates of the battery and prevent the disintegration of the active material that is carried by the openings or interstices in said plates.

With the foregoing and other objects in view, my invention consists in certain novel features of construction and arrangement of parts that will be hereinafter more fully described and claimed and illustrated in the accompanying drawings in which:

Figure 1:
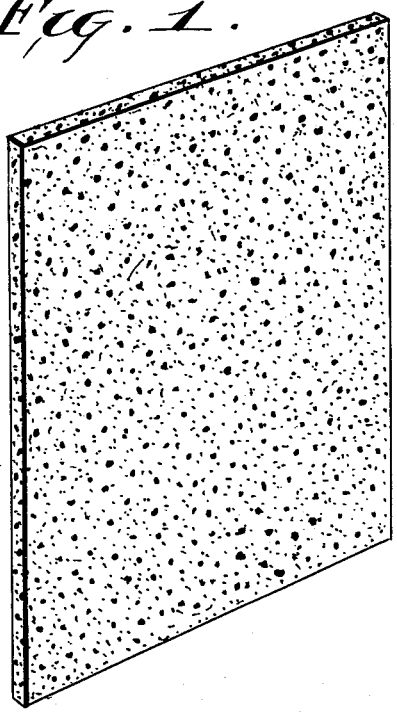
Fig. 1 is a perspective view of a separator element produced in accordance with my invention.
Figure 2:
Fig. 2 is a detail section showing a portion of my improved separator positioned between a pair of battery grids or plates.

In the production of the battery plate separator elements in accordance with my improved method, I use practically any vegetable or wood fibre and the first step in the method is to reduce this fibre to relatively small particles by grinding or attrition.

This finely divided material is then mixed with sufficient water to form a pulp and the latter is placed in a suitable vat or container and boiled for approximately eight hours.

During the boiling of the pulp, the latter should be stirred or agitated by suitable means.

After boiling, the pulp is thoroughly washed to remove all dirt and impurities and the cleansed pulp is subjected to the direct action of steam in order to open the pores of the minute particles of fibre.

The steam treated material is then treated with a solution of soda and boiled for approximately twelve hours, and it is then allowed to stand in the soda solution for approximately twenty-four hours.

The material is then washed and rewashed until all traces of the soda have been removed. The treatment of the material with soda removes from said material all acetic acid and renders said material immune to the action of sulphuric acid when the finished separator element is placed in a battery jar and absorbs the electrolyte.

The cleansed material is now tested with a 10% solution of 10 grains crystals of nitrate of silver to the ounce, in order to determine traces of iron, if any, and if this test proves negative, or absence of iron traces, the material is then ready to be formed into sheets.

To a given quantity of the treated pulp is mixed 2% of pulverized pure rubber and 1% sodium silicate, and after thorough mixture, the material is, by suitable means formed into large sheets, which when dry, are approximately one-sixteenth of an inch in thickness.

When thoroughly dry, the large sheets are cut up into sections of required sizes for battery separator elements.

The separator sheets are now inserted between the positive and negative battery plates in the usual manner and the groups of plates are then assembled and placed in the battery jar or container, after which the usual lead connections are burned in.

The electrolyte, consisting of a mixture of sulphuric acid and water having a specific gravity of about 12.75, hydrometer test, is now poured into the battery jar or container and the latter is allowed to stand until the separator sheets have absorbed the electrolyte to the limit of their absorptive capacities.

The battery is now placed on a charging line and charged with an electric current of approximately three amperes for approximately seventy-two hours according to the size of the unit.

The battery is then given three cycles of discharge with a recharge between each cycle and, after the battery has been thus charged, and the plates primed, it is turned upside down to permit the escape of any excess electrolyte and said battery is now ready for use.

Battery separator elements constructed in accordance with my invention have a high degree of porosity and therefore they are capable of absorbing and retaining a relatively large amount of electrolyte.

In so doing the porous sheets swell, thereby completely filling the spaces between the lead plates or grids and thus said sheets function as packing or filling members to bear directly against the faces of the lead plates or grids, and the active material carried thereby, and thus said active material is held in place and prevented from dropping away from the grid and accumulating as "lead mud" in the bottom of the battery container.

As a result of the conditions just described, the life or period of efficiency of my improved battery is materially prolonged.

The presence of the pulverized rubber throughout the porous separator sheets tends to diffuse the gases that rise through the cell, and consequently minimizing tendency of corrosion of the battery terminals.

The sodium silicate incorporated in the pulp mixture from which the sheets are formed, gives body to the finished sheets and functions as an adhesive or binder.

Inasmuch as all the electrolyte contained in the battery is held by absorption in the separator sheets, there can be no spilling or slopping, and consequent loss of the electrolyte and there can be no loss of electrolyte in the event that the jar or container becomes cracked or broken.

The use of my improved separator elements prevents sulphation, inasmuch as they are always in intimate contact with the entire surfaces of the grids or lead plates and the absence of free electrolyte insures cleanliness and enables the battery to be readily handled without attendant danger of acid burns.

The use of the separator sheets precludes the necessity for forming bridges in the bottoms of the battery jars, thereby permitting the use of longer grids, with a result of greater efficiency in batteries of standard measurement.

A battery equipped with my improved separator sheets cannot be overheated as the saturated sheets act as condensers and as the sheets are not saturated until the battery is made ready for use, there will be no deterioration where a number of sheets and batteries are carried in stock.

In producing the pulp used in the manufacture of my improved separator elements, various vegetable or wood fibres may be used, but I prefer to use bagasse, which is the fibre of sugar cane or sugar beets.

Having thus described my invention, what I claim is:

1. The herein described method of producing storage battery plate separator elements, which consists in producing a pulp composed of pulverized vegetable fibre and water, boiling said pulp, then washing said pulp to remove all dirt and impurities, then subjecting the cleansed pulp to the direct action of steam, then treating the pulp with a soda solution, then rewashing the pulp to remove all traces of soda and then mixing with said pulp a small quantity of pulverized rubber.

2. The herein described method of producing storage battery plate separator elements, which consists in producing a pulp composed of pulverized vegetable fibre and water, boiling said pulp, then washing said pulp to remove all dirt and impurities, then subjecting the cleansed pulp to the direct action of steam, then treating the pulp with a soda solution, then rewashing the pulp to remove all traces of soda, then mixing with said pulp relatively small quantities of pulverized rubber and sodium silicate and then forming said pulp into sheets and permitting the same to dry.

3. As a new article of manufacture, a storage battery plate separator element comprising a sheet of porous absorptive material composed of dried vegetable fibre pulp, which has been treated with a soda solution, and which has incorporated therewith a relatively small amount of pulverized rubber.

4. As a new article of manufacture, a storage battery plate separator element comprising a sheet of porous absorptive material composed of dried vegetable fibre pulp, which has been treated with a soda solution, and having incorporated therewith relatively small amounts of pulverized rubber and silicate of soda.

In testimony whereof I affix my signature.

NATHAN FALLEK.